United States Patent
Choi et al.

(10) Patent No.: US 9,405,260 B2
(45) Date of Patent: Aug. 2, 2016

(54) POWER TRANSMITTING APPARATUS AND IMAGE FORMING APPARATUS ADOPTING THE SAME

(71) Applicant: Samsung Electronics Co., Ltd., Suwon-si (KR)

(72) Inventors: Jung-hoon Choi, Seoul (KR); Hyun-soo Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/912,624

(22) Filed: Jun. 7, 2013

(65) Prior Publication Data
US 2014/0140745 A1 May 22, 2014

(30) Foreign Application Priority Data
Nov. 16, 2012 (KR) .................. 10-2012-0130509

(51) Int. Cl.
G03G 15/00 (2006.01)
F16D 11/14 (2006.01)
F16D 41/22 (2006.01)

(52) U.S. Cl.
CPC ............. G03G 15/757 (2013.01); F16D 11/14 (2013.01); F16D 41/22 (2013.01)

(58) Field of Classification Search
CPC ........... B65H 2403/721; G03G 15/757; F16D 41/14; F16D 14/22
USPC ............................................ 399/381, 21–23
See application file for complete search history.

(56) References Cited

U.S. PATENT DOCUMENTS

| 2,271,216 A | 1/1942 | Ysskin |
| 2,515,543 A | 7/1950 | Ysskin |
| 3,265,174 A | 8/1966 | Polzin |
| 7,185,747 B2 * | 3/2007 | Cha ................................ 192/46 |

(Continued)

FOREIGN PATENT DOCUMENTS

| DE | 108023 | 3/1899 |
| DE | 128655 | 7/1901 |

(Continued)

OTHER PUBLICATIONS

Extended European Search Report dated Oct. 30, 2015 in European Patent Application No. 13173628.2.

*Primary Examiner* — Matthew G Marini
(74) *Attorney, Agent, or Firm* — Staas & Halsey LLP (57) ABSTRACT

A power transmitting apparatus includes a driving source, a driving member rotated by the driving source, a driven member linked with the driving member to rotate, a transmitting member disposed between the driving member and the driven member, the transmitting member being rotated by the driving member, axially moved along a rotation direction of the driving member so that the transmitting member is connected to the driven member, and an elastic member disposed between the transmitting member and the driven member, the elastic member providing an elastic bias into the transmitting member so that the transmitting member is separated from the driven member.

20 Claims, 7 Drawing Sheets

(56) References Cited

U.S. PATENT DOCUMENTS

| | | |
|---|---|---|
| 8,727,256 B2 | 5/2014 | Tanaka |
| 2008/0190714 A1 | 8/2008 | Pan |
| 2010/0069194 A1 | 3/2010 | Cheng |
| 2010/0272470 A1* | 10/2010 | Tomatsu et al. ............... 399/167 |
| 2010/0303503 A1* | 12/2010 | Woo ............................... 399/167 |
| 2011/0031085 A1 | 2/2011 | Reisch et al. |
| 2011/0185830 A1 | 8/2011 | Chen |
| 2011/0198181 A1* | 8/2011 | Tu et al. ........................ 192/20 |

FOREIGN PATENT DOCUMENTS

| | | | |
|---|---|---|---|
| JP | 2008150183 A | * | 7/2008 |
| JP | 2010-48299 | | 3/2010 |
| KR | 10-0260007 | | 6/2000 |
| KR | 10-0569992 | | 4/2006 |
| KR | 10-1034749 | | 5/2011 |
| KR | 10-2012-0079114 | | 7/2012 |
| KR | 10-1143811 | | 7/2012 |
| KR | 10-1165075 | | 7/2012 |

* cited by examiner

POWER TRANSMITTING APPARATUS AND IMAGE FORMING APPARATUS ADOPTING THE SAME

CROSS-REFERENCE TO RELATED APPLICATIONS

This application claims the priority benefit of Korean Patent Application No. 10-2012-0130509, filed on Nov. 16, 2012, in the Korean Intellectual Property Office, the disclosure of which is incorporated herein in its entirety by reference.

BACKGROUND

1. Field

The following description relates to a power transmitting apparatus and an image forming apparatus adopting the same, and more particularly, to a power transmitting apparatus in which a driven member is in an idle state when power is released, and an image forming apparatus adopting the same.

2. Description of the Related Art

Image forming apparatuses may be apparatuses for forming an image on a recording medium. Examples of such image forming apparatuses may include a printer, a copier, a fax machine, and a complexer having integrated functions of the printer, the copier, and the fax machine.

An image forming apparatus includes roller members which transfer a recording medium while the record medium is fed, printed, fused, and discharged. Here, a jam in which the recording medium is jammed between the roller members may occur. When the jam occurs, a user may remove the recording medium jammed between the roller members.

However, when the recording medium is removed, the recording medium may be torn or more seriously jammed between the roller members and remain within a main body. As a result, the remaining recording medium may cause additional errors such as image forming defects.

SUMMARY

Additional aspects and/or advantages will be set forth in part in the description which follows and, in part, will be apparent from the description, or may be learned by practice of the invention.

The following description relates to a mechanism that engages a recording medium transfer roller in an image forming apparatus with a driving force when the roller is driven, and disengages the transfer roller from the driving force when the roller is not being driven. The mechanism is mechanically extended to contact the roller during a driven rotation, and elastically retracted from the roller when the roller is not being driven. Accordingly, when the roller is not being driven, the roller may be manipulated freely, without interference from the driving force, by a user in order to extract a recording medium that has caused a jam in the image forming apparatus.

The present general inventive concept relates to a power transmitting apparatus in which a driven member is idle in both directions to allow a smooth removal of a recording medium jammed on the roller member that is fixedly connected to the driven member, and an image forming apparatus adopting the same.

According to an aspect of the present general inventive concept, a power transmitting apparatus may include a driving source; a driving member rotated by the driving source; a driven member selectively linked with the driving member to rotate; a transmitting member disposed between the driving member and the driven member, the transmitting member being rotated by the driving member, axially moved along a rotation direction of the driving member so that the transmitting member is selectively connected to the driven member; and an elastic member disposed between the transmitting member and the driven member, the elastic member providing an elastic bias into the transmitting member so that the transmitting member is selectively separated from the driven member.

When the rotation of the driving member is stopped, the transmitting member may be separated from the driven member by the elastic bias of the elastic member.

The elastic member may have an elastic force that is less than a force axially applied into the transmitting member by the driving member when the driving member is rotated.

One of the driving member and the transmitting member may include an inclined part that is inclined in the rotation direction of the driving member to guide the movement of the transmitting member in the axis direction when the driving member is rotated, and the other one of the driving member and the transmitting member may include a contact part contacting the inclined part.

The contact part may have a shape corresponding to that of the inclined part.

The transmitting member may be connected to the driven member by coupling a protrusion to a groove corresponding to the protrusion.

One of the transmitting member and the driven member may include the protrusion that protrudes axially, and the other one of the transmitting member and the driven member may include the groove corresponding to the protrusion.

A contact surface between the protrusion and the groove may be inclined with respect to the rotation direction of the transmitting member so that the transmitting member is closely approached to the driven member.

An axially moving distance of the transmitting member may be less than an axially overlapping distance between the transmitting member and the driving member.

The axially moving distance of the transmitting member may be greater than a height of the protrusion.

The power transmitting apparatus may further include a friction member disposed between the transmitting member and the driven member.

According to an aspect of the present general inventive concept, an image forming apparatus may include a paper feeding device feeding a recording medium; a printing device forming an image on the recording medium; a fusing device applying heat and pressure to the recording medium on which the image is formed by the printing device; and a discharge device discharging the recording medium passing through the fusing device, wherein at least one of the paper feeding device, the printing device, and the discharge device includes a roller member transferring the recording medium and a power transmitting apparatus transmitting power to the roller member, wherein the power transmitting apparatus includes: a driving source; a driving member rotated by the driving source; a driven member selectively linked with the driving member to rotate, the driven member being fixedly connected to the roller member; a transmitting member disposed between the driving member and the driven member, the transmitting member being rotated by the driving member, axially moved along a rotation direction of the driving member so that the transmitting member is selectively connected to the driven member; and an elastic member disposed between the transmitting member and the driven member, the elastic member providing an elastic bias into the transmitting member so that the transmitting member is selectively separated from the driven member.

When the rotation of the driving member is stopped, the transmitting member may be separated from the driven member by the elastic bias of the elastic member.

The elastic member may have an elastic force that is less than a force axially applied into the transmitting member by the driving member when the driving member is rotated.

One of the driving member and the transmitting member may include an inclined part that is inclined in the rotation direction of the driving member to guide the movement of the transmitting member in the axis direction when the driving member is rotated, and the other one of the driving member and the transmitting member may include a contact part contacting the inclined part.

The contact part may have a shape corresponding to that of the inclined part.

The transmitting member may be connected to the driven member by coupling a protrusion to a groove corresponding to the protrusion.

One of the transmitting member and the driven member may include the protrusion that protrudes axially, and the other one of the transmitting member and the driven member may include the groove corresponding to the protrusion.

A contact surface between the protrusion and the groove may be inclined with respect to the rotation direction of the transmitting member so that the transmitting member is closely approached to the driven member.

An axially moving distance of the transmitting member may be less than an axially overlapping distance between the transmitting member and the driving member.

The axially moving distance of the transmitting member may be greater than a height of the protrusion.

The image forming apparatus may further include a friction member disposed between the transmitting member and the driven member.

The protrusion and groove may include a hook protrusion and hook groove, respectively.

According to an aspect of the present general inventive concept, a method for selectively applying a driving force to a recording medium transfer roller in an image forming apparatus is provided, the method including rotating a driving member using the driving force, selectively linking the roller with the driving member to rotate the roller, providing an elastic force to a transmitting member with an elastic member during a non-rotation by the driving member, so that the transmitting member is selectively separated from the roller, wherein the transmitting member is disposed between the driving member and the roller, the elastic member is disposed between the transmitting member and the roller and providing a mechanical force to the transmitting member during the rotation by the driving member, to overcome the elastic force so that the transmitting member is selectively connected to the roller.

According to an aspect of the present general inventive concept, a method for selectively applying a driving force to a recording medium transfer roller in an image forming apparatus includes rotating a driving member using the driving force; selectively linking the roller with the driving member to rotate the roller; providing an elastic force to the transmitting member with an elastic member disposed between the transmitting member and the roller during a non-rotation by the driving member, so that the transmitting member is selectively separated from the roller; and providing a mechanical force to a transmitting member disposed between the driving member and the roller during the rotation by the driving member, to overcome the elastic force so that the transmitting member is selectively connected to the roller.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

The present general inventive concept will now be described more fully with reference to the accompanying drawings, in which exemplary embodiments of the present general inventive concept are shown.

Figure 1:
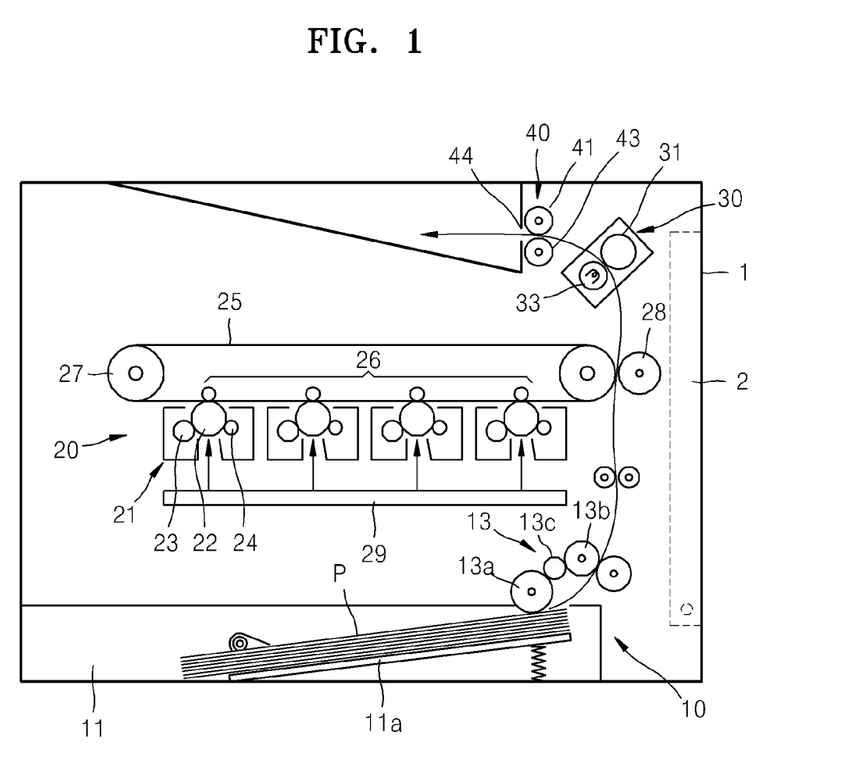
FIG. 1 is a view of an image forming apparatus according to an embodiment of the present general inventive concept.

FIG. 1 is a view of an image forming apparatus according to an embodiment of the present general inventive concept.

As shown in FIG. 1, the image forming apparatus includes a paper feeding device 10, a printing device 20, a fusing device 30, and a discharge device 40.

The paper feeding device 10 receives a recording medium P to feed the recording medium P into the printing device 20. The paper feeding device 10 includes a paper feeding cassette 11 and a transfer roller unit 13 to feed the recording medium P into the printing device 20.

Recording media P are stacked within the paper feeding cassette 11. Also, the paper feeding cassette 11 is removably mounted into a main body 1 of the image forming apparatus. A knock-up plate 11a for making the stacked recording medium P contact the transfer roller unit 13 may be disposed within the paper feeding cassette 11. The knock-up plate 11a may be elastically biased in a direction of the transfer roller unit 13 so that the recording medium P contacts the transfer roller unit 13.

The transfer roller unit 13 picks up the recording medium P to transfer the picked-up recording medium P. The transfer roller unit 13 includes a pick-up roller 13a and a forward roller 13b. The pick-up roller 13a contacts the recording medium P to pick up the recording medium P. The forward roller 13b is connected to the pick-up roller 13a by an intermediate roller 13c and is rotated in the same direction as that of the pick-up roller 13a.

The printing device 20 forms an image on the recording medium P fed from the paper feeding device 10. For example, the printing device 20 may form an image on the recording medium P by using an electrophotographic method. The printing device 20 may include a developer 21, an intermediate transfer belt 25, an intermediate transfer roller 26, a final transfer roller 28, and exposure unit 29. The printing device 20 forms a color image by using toners of cyan, magenta, yellow, and black colors. For this, four developers 21 for respectively receiving the toners of cyan, magenta, yellow, and black colors may be adopted.

The exposure unit 29 emits light modulated corresponding to image information onto a photosensitive drum of each of the developers 21 to form an electrostatic latent image. An LED type exposure unit in which a plurality of LEDs arranged in a main scanning direction selectively emit light according to the image information may be adopted as the exposure unit 29. Alternatively, a laser scanning unit (LSU) which biases light emitted from a laser diode in the main scanning direction by using an optical deflector to scan a photosensitive drum 22 may be adopted as the exposure unit 29. The photosensitive drum 22 may be one example of a photosensitive member on which the electrostatic latent image is formed. For example, a photosensitive layer having optical conductivity may be formed on an outer surface of a cylindrical metal pipe to manufacture the photosensitive drum 22.

The developer 21 attaches toner received therein to the electrostatic latent image formed on the photosensitive drum 22 to form a toner image. The developer 21 may include a developing roller 23 supplying the toner received within the developer 21 onto the electrostatic latent image formed on the photosensitive drum 22 and a charge roller 24 charging a surface of the photosensitive drum 22 at an uniform electric potential.

A developing bias voltage via which the toner is supplied onto the electrostatic latent image is applied to the developing roller 23, and a charging bias voltage is applied to the charge roller 24.

The intermediate transfer belt 25 may be an intermediate transfer medium on which the toner image is temporarily transferred before the toner image is finally transferred onto the recording medium P. The intermediate transfer belt 25 may be supported by support rollers 27 to circulate.

The intermediate transfer roller 26 may be one example of an intermediate transfer member which transfers the toner image formed on the photosensitive drum 22 onto the intermediate transfer belt 25. The intermediate transfer roller 26 includes four intermediate transfer rollers that respectively face the four photosensitive drums 22 with the intermediate transfer belt 25 therebetween. An intermediate transfer bias voltage via which the toner image formed on the photosensitive drum 22 is transferred onto the intermediate transfer belt 25 is applied to the intermediate transfer roller 26. The toner images of cyan, magenta, yellow, and black colors, which are respectively formed on the four photosensitive drums 22 of the four developers 21, are transferred onto the intermediate transfer belt 25 by intermediate transfer electric fields formed by the intermediate transfer bias voltage.

The final transfer roller 28 may be one example of a final transfer member which transfers the toner image formed on the intermediate transfer belt 25 onto the recording medium P. A final transfer bias voltage via which the toner image formed on the intermediate transfer belt 25 is transferred onto the recording medium P may be applied to the final transfer roller 28. While the recording medium P is transferred between the intermediate transfer belt 25 and the final transfer roller 28, the toner image formed on the intermediate transfer belt 25 is transferred onto the recording medium P by a final transfer electric field formed by the final transfer bias voltage.

The recording medium P passing through the final transfer roller 28 is transferred into the fusing device 30. The fusing device 30 includes a heating roller 31 and a press roller 33. The heating roller 31 and the press roller 33 apply heat and pressure to the toner image transferred onto the recording medium P to fuse the toner image. The discharge device 40 includes discharge rollers 41 and 43. The recording medium P passing through the printing device 20 and the fusing device 30 is discharged to the outside by the discharge rollers 41 and 43.

The paper feeding device 20, the printing device 20, the fusing device 30, and the discharge device 40, which are parts of the above-described image forming apparatus, include roller members, for example, the transfer roller unit 13, the intermediate and fusion transfer rollers 26 and 28, the heating and press rollers 31 and 33, and the discharge rollers 41 and 43. A jam in which the recording medium P is jammed may occur by various causes while transferring the recording medium P on at least one of the roller members 13, 26, 28, 31, 33, 41, and 43. When the jam occurs, it may be necessary for a user to remove the jammed recording medium P from the roller members 13, 26, 28, 31, 33, 41, or 43.

Figure 2:
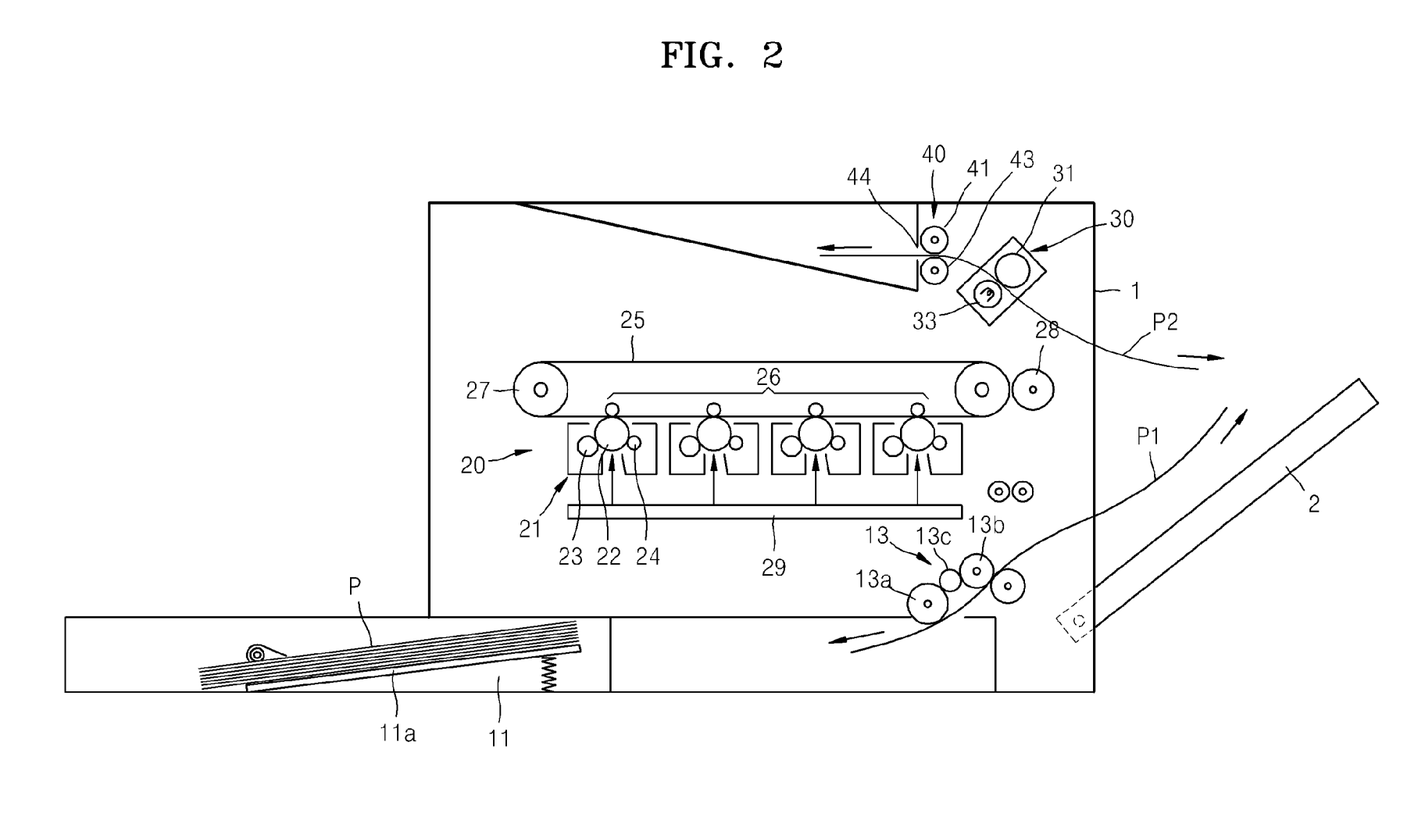
FIG. 2 is a view illustrating a state while a recording medium is removed from the image forming apparatus of FIG. 1.

FIG. 2 is a view illustrating a state while a recording medium P is removed from the image forming apparatus of FIG. 1. As shown in FIG. 2, when a jam occurs during the operation of the image forming apparatus, a user may shut off power supplied to the rollers 13, 26, 28, 31, 33, 41, and 43, and then open a cover 2 or withdraw the paper feeding cassette 11 to remove jammed recording media P1 and P2. For example, when the recording medium P1 is jammed on the transfer roller 13, the user may pull the recording medium P1 after opening the cover 2, or may pull the recording medium P1 in an opposite direction after withdrawing the paper feeding cassette 11, thereby removing the recording medium P1.

As another example, when the recording medium P2 is jammed on the heating and press rollers 31 and 33, the user may remove the recording medium P2 through a discharge part 44, or remove the recording medium P2 in an opposite direction after opening the cover 2. Here, if the roller members 13, 31, and 33 on which the recording media P1 or P2 are jammed are rotated in only one direction, when the recording media P1 or P2 are pulled in the other direction, the roller members 13, 31, and 33 are not rotated with the recording media P1 or P2, such that the recording media P1 or P2 may be torn. As a result, it may be difficult to remove the recording media P1 and P2. However, in the image forming apparatus according to the present general inventive concept, because the roller members 13, 31, and 33 are bilaterally rotated when power is released, the tearing of the recording media P1 and P2 may be prevented even though the recording media P1 and P2 are pulled in any direction.

Hereinafter, a power transmitting apparatus used in the image forming apparatus according to the present general inventive concept will be described in detail. For convenience of description, the reference numerals 13, 26, 28, 31, 33, 41, or 43 of the roller members will be referred to by the reference numeral 200.

Figure 3:
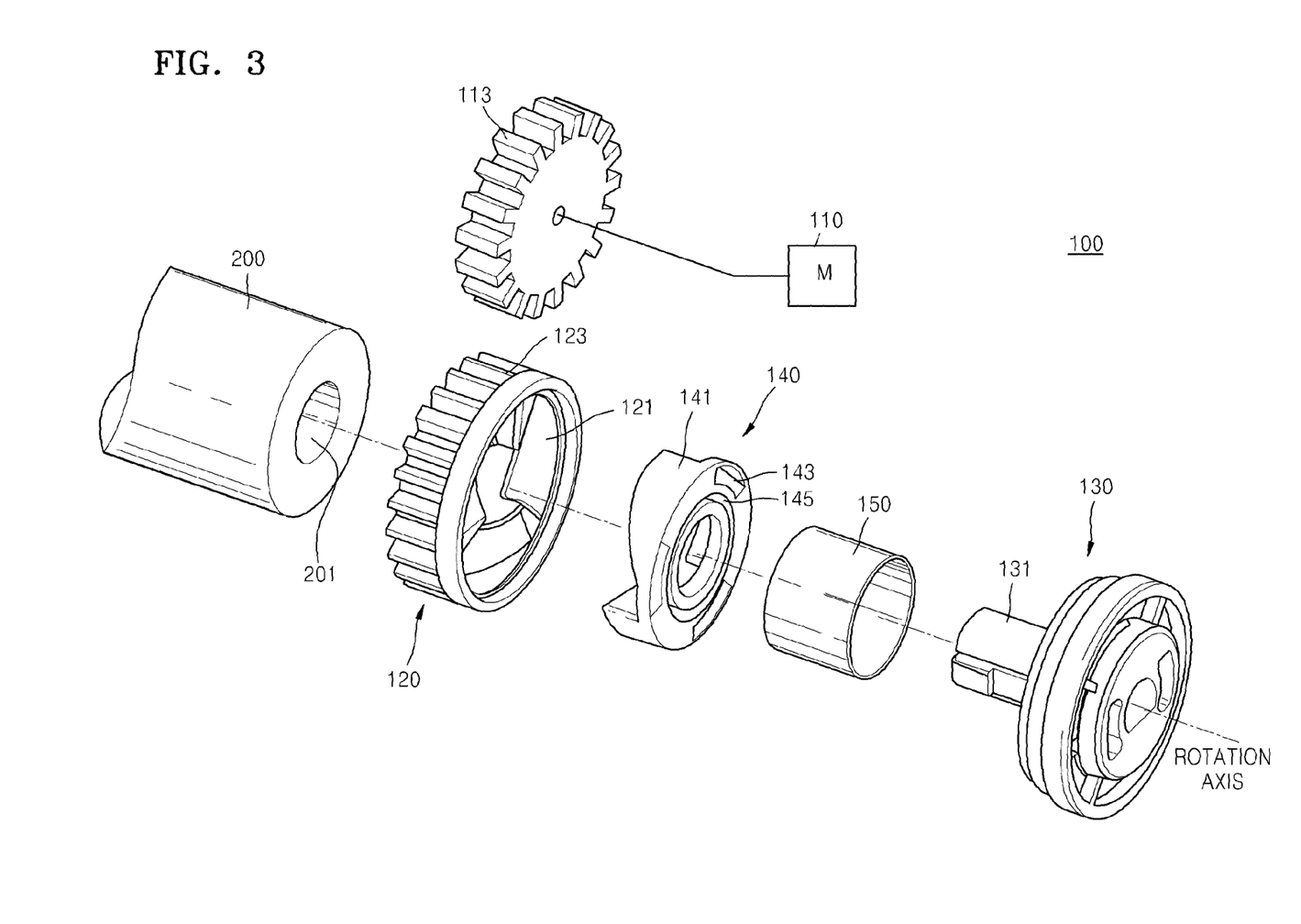
FIG. 3 is a schematic exploded perspective view of a power transmitting apparatus used in an image forming apparatus according to an embodiment.
Figure 4:
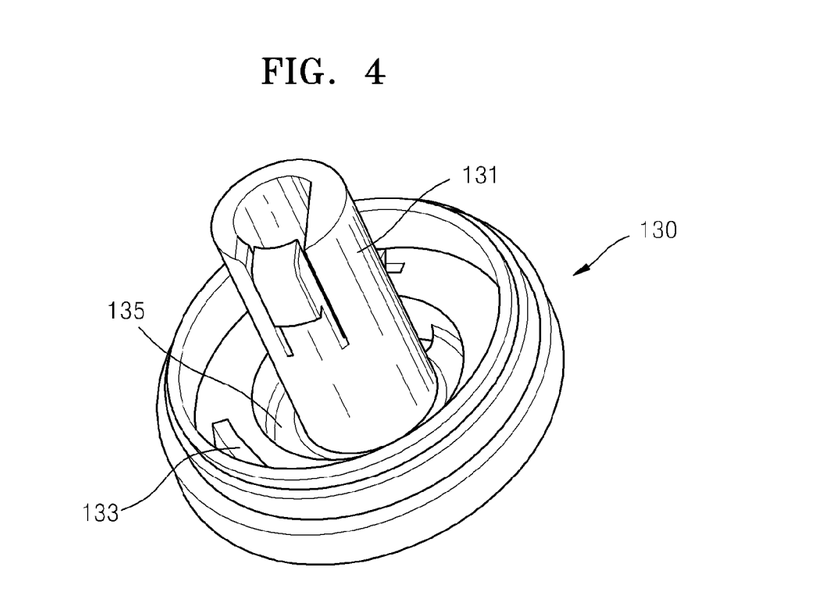
FIG. 4 is a schematic perspective view of a driven member in the power transmitting apparatus of FIG. 3.

FIG. 3 is a schematic exploded perspective view of a power transmitting apparatus 100 used in an image forming apparatus according to an embodiment. FIG. 4 is a schematic perspective view of a driven member 130 in the power transmitting apparatus of FIG. 3.

Referring to FIG. 3, the power transmitting apparatus 100 includes a driving member 120, a transmitting member 140, an elastic member 150, and the driven member 130.

The driving member 120 is rotated by a driving motor that is a driving source 110. The driving member 120 is directly or indirectly connected to the driving source 110 by a gear part 123 disposed on an outer portion thereof to receive a driving force generated in the driving motor to thus rotate. For example, when the driving member 120 is connected to the driving source 110, as shown in FIG. 3, the gear part 123 of the driving member 120 may be engaged with a gear part 113 that is coaxially connected to the driving source 110.

The driven member 130 may be spaced from the driving member 120 in an axis direction. Also, the transmitting member 140 may be disposed between the driven member 130 and the driving member 120. The driven member 130 may be linked with the driving member 120 by the transmitting member 140 and thus be rotated. The driven member 130 may be fixedly connected to the roller member 200. To fixedly connect the driven member 130 to the roller member 200, one end 131 of the driven member 130 may be inserted into an insertion part 201 of the roller member 200. When the driven member 130 is rotated by the driving member 120, the roller member 200 that is fixedly connected to the driven member 130 may be rotated together with the driven member 130. On the other hand, when the roller member 200 is rotated by an external force, the driven member 130 may be rotated together with the roller member 200.

The transmitting member 140 is disposed between the driving member 120 and the driven member 130. The transmitting member 140 may contact the driving member 120 and be rotated by the rotation of the driving member 120. A contact part 141 of the transmitting member 140 protruding toward the driving member 120 contacts the driving member 120. Thus, as the driving member 120 is rotated, the transmitting member 140 is rotated in the same direction as that of the driving member 120.

The driving member 120 may include an inclined part 121, which is inclined with respect to the rotation direction of the driving member 120 in an area corresponding to the contact part 141. In a state where the contact part 141 of the transmitting member 140 contacts the inclined part 121 of the driving member 120, as the driving member 120 is rotated, the contact part 141 of the transmitting member 140 is moved along the axis direction. When the driving member 120 is rotated, the inclined part 121 of the driving member 120 may guide the movement of the transmitting member 140 in the axis direction. Here, although the inclined part 121 is illustrated in a spiral groove shape, and the contact part 141 is illustrated in a spiral protrusion shape, the present general inventive concept is not limited thereto. For example, the inclined part 121 and the contact part 141 may have various shapes as long as the inclined part 121 and the contact part 141 guide the movement of the transmitting member 140 in the axis direction. Also, the axis direction may represent an extension direction of a rotation axis.

Referring to FIGS. 3 and 4, the transmitting member 140 moving along the axis direction may be connected to the driven member 130. The transmitting member 140 may be connected to the driven member 130 by coupling a hook protrusion 133 to a hook groove 143 corresponding to the hook protrusion 133. The hook protrusion 133 protruding toward the transmitting member 140 may be disposed on the driven member 130. The hook protrusion 133 is coupled to the hook groove 143 of the transmitting member 140 to connect the transmitting member 140 to the driven member 130. As the transmitting member 140 is axially moved by the driving member 120, the transmitting member 140 may be connected to the driven member 130. For example, a plurality of hook protrusions 133 protruding toward the transmitting member 140, e.g., three hook protrusions 133, may be disposed on the driven member 130. Also, a plurality of hook grooves 143 corresponding to the plurality of hook protrusions 133, e.g., three hook grooves 143, may be defined in the transmitting member 140. The transmitting member 140 rotated by the driving member 120 may transmit a rotation force to the driven member 130 by coupling the hook protrusion 133 to the hook groove 143. Although the three hook protrusions 133 and the three hook grooves 143 are illustrated in FIGS. 3 and 4, the present general inventive concept is not limited thereto. For example, the number of hook protrusions and hook grooves may be greater or lower than three. Also, although the hook grooves 143 are defined in the transmitting member 140, and the hook protrusions 133 are disposed on the driven member 130 in the current embodiment, the present general inventive concept is not limited thereto. For example, the hook protrusions 133 may be disposed on the transmitting member 140, and the hook grooves 143 may be defined in the driven member 130. Also, the protrusion and the groove are not limited to a hook type configuration. Any combination of protrusion and groove that provides a mechanism to transmit the rotation force may be used.

The elastic member 150 may be disposed between the transmitting member 140 and the driven member 130. The elastic member 150 provides an elastic bias into the transmitting member 140 in a direction of the driving member 120. Thus, when the rotation of the driving member 120 is stopped, the transmitting member 140 may be separated from the driven member 130 by the elastic member 150. Although the elastic member 150 may be an elastic body having a cylindrical shape as shown in FIGS. 3 and 4, the present general inventive concept is not limited thereto. For example, the elastic member 150 may be a coil spring. Also, although a single elastic member 150 is provided as shown in FIGS. 3 and 4, the present general inventive concept is not limited thereto. For example, a plurality of elastic members may be disposed spaced apart from each other in a circumferential direction. The elastic member 150 may be disposed in seat grooves 135 and 145 respectively defined in the transmitting member 140 and the driven member 130.

Figure 5:
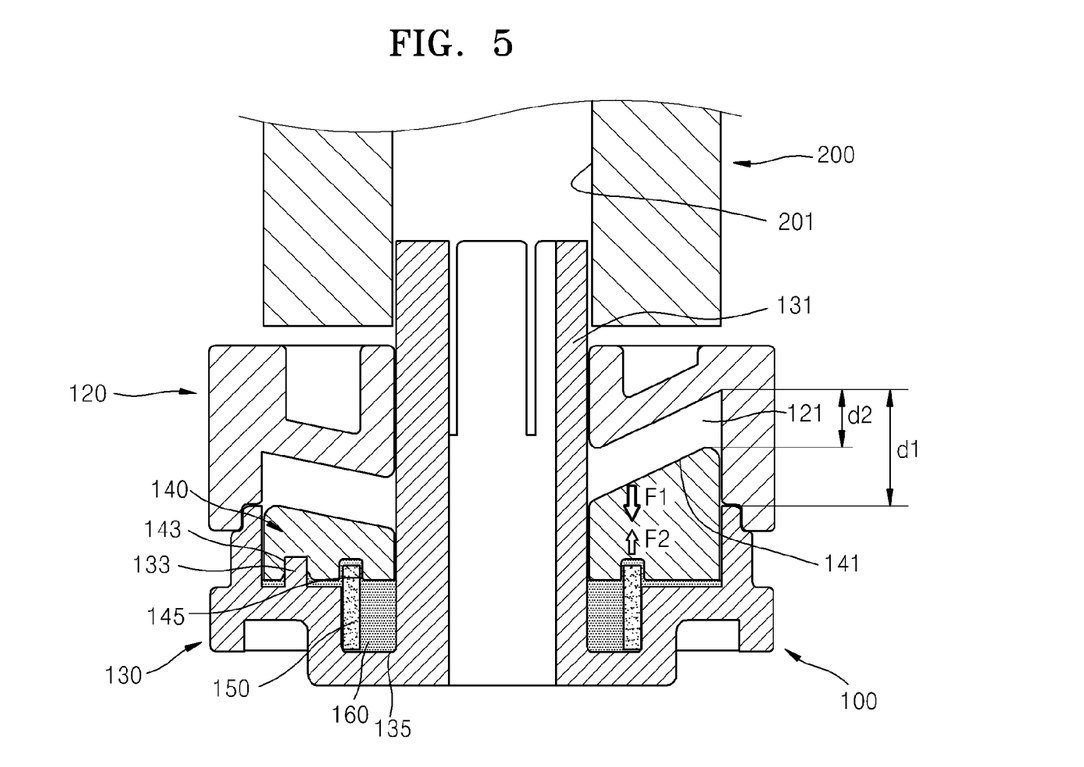
FIG. 5 is a schematic cross-sectional view illustrating an arrangement relationship between parts when a driving member is rotated in the power transmitting apparatus of FIG. 3.

FIG. 5 is a schematic cross-sectional view illustrating an arrangement relationship between parts when the driving member 120 is rotated in the power transmitting apparatus 100 of FIG. 3.

Referring to FIG. 5, at least one portion of the transmitting member 140 is inserted into the driving member 120 to contact the driving member 120. In a state where the inclined part 121 of the driving member 120 contacts the contact part 141 of the transmitting member 140, as the driving member 120 is rotated, the contact part 141 of the transmitting member 140 may be axially moved and then be connected to the driven member 130, as shown in FIG. 5. The transmitting member 140 may be connected to the driven member 130 by coupling the hook protrusion 133 to the hook groove 143 defined in the transmitting member 140. Here, the elastic member 150 disposed between the driven member 130 and the transmitting member 140 is compressed by the movement of the transmitting member 140 in the axis direction.

Figure 6A:
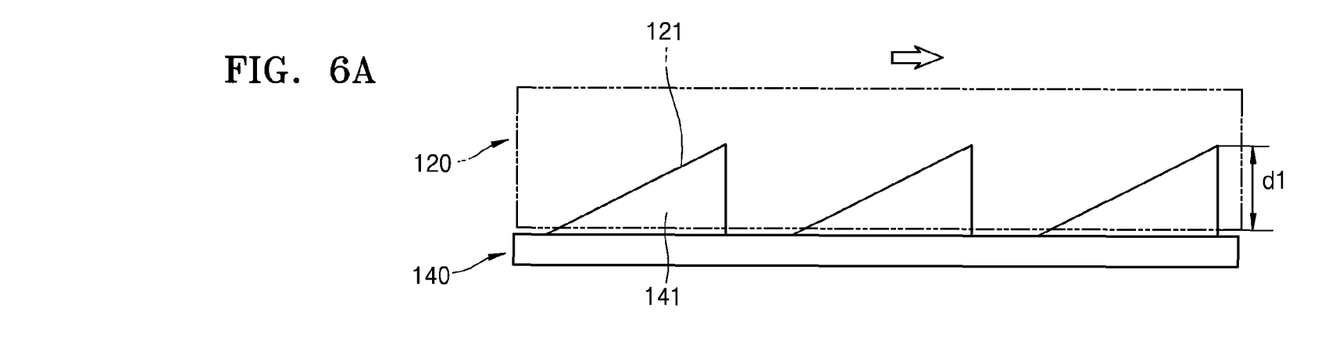
FIGS. 6A and 6B are schematic views illustrating an operation relationship between the driving member and a transmitting member of FIG. 3.
Figure 6B:
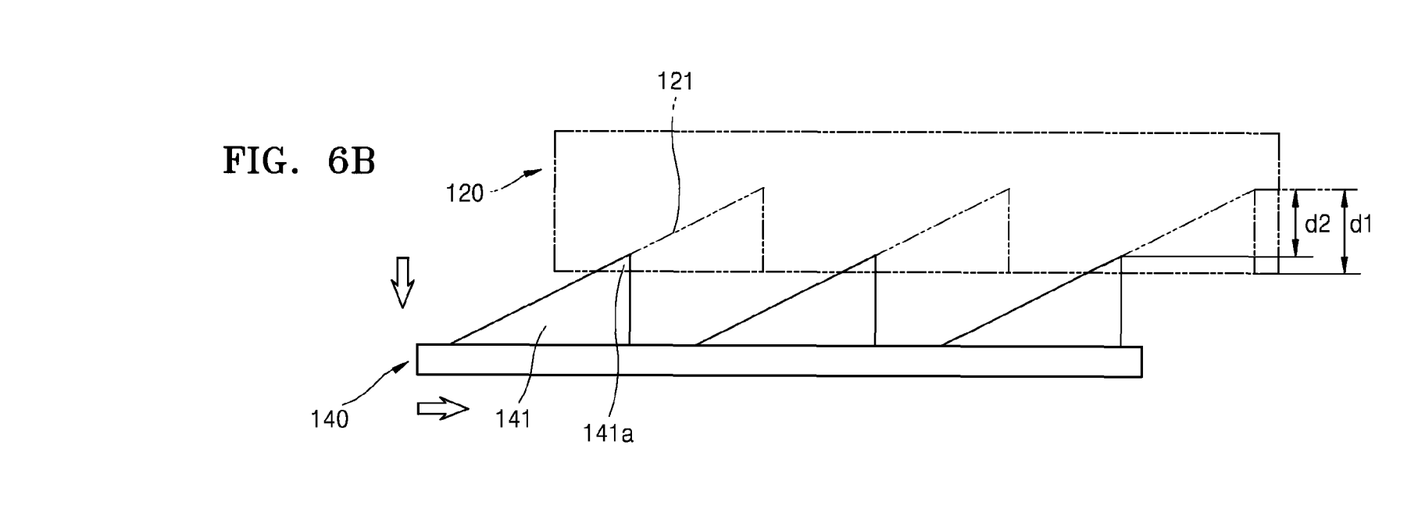

FIGS. 6A and 6B are schematic views illustrating an operation relationship between the driving member 130 and the transmitting member 140 of FIG. 3. FIG. 6A illustrates a state before the driving member 130 is rotated, and FIG. 6B illustrates a state in which the driving member 130 is rotated. FIG.

Figure 7:
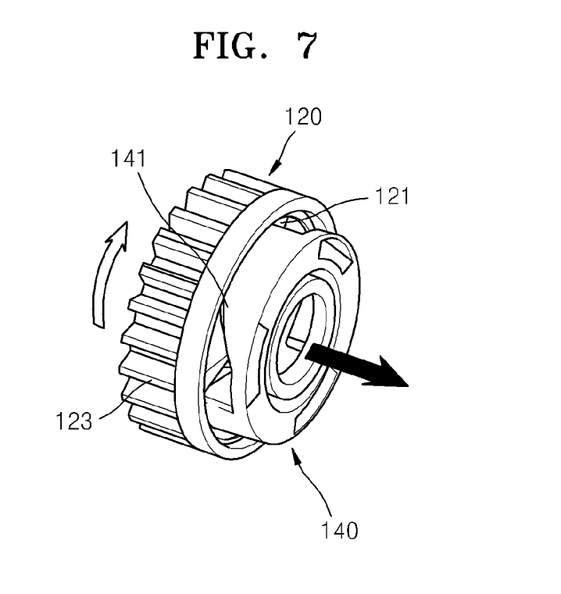
FIG. 7 is a schematic perspective view of the driving member and the transmitting member of FIG. 3.

7 is a schematic perspective view illustrating operation states of the driving member 130 and the transmitting member 140 of FIG. 3.

In a case when power is not transmitted to the driving member 120 by the driving source 110, as shown in FIG. 6A, the transmitting member 140 overlaps the driving member 120. In a state where the transmitting member 140 and the driving member 120 overlap each other, the driving member 120 is rotated in an arrow direction by the driving source 110. Here, a distance in which the driving member 120 and the transmitting member 140 axially overlap each other may be called an axially overlapping distance d1 between the driving member 120 and the transmitting member 140.

Referring to FIG. 6B, when the driving member 120 receives power from the driving source 110 and is rotated, the transmitting member 140 is axially moved along the inclined part 121. As the driving member 120 is rotated in any one direction as shown in FIG. 7, the transmitting member 140 is axially moved. As the driving member 120 is rotated, the transmitting member 140 may descend as shown in FIG. 6B, and then, be rotated with the driving member 120 in a state where the inclined part 121 of the driving member 120 and a portion 141a of the contact part 141 of the transmitting part 140 contact each other. For this, an axially moving distance d2 of the transmitting member 140 may be less than the axially overlapping distance d1 between the driving member 120 and the transmitting member 140. Because the axially moving distance d2 of the transmitting member 140 is less than the axially overlapping distance d1 between the driving member 120 and the transmitting member 140, the transmitting member 140 may not be separated from the driving member 120, but be rotated by the driving member 120 in the state where the transmitting member 140 contacts the driving member 120.

When the driving member 120 is rotated in a direction opposite to the arrow direction of FIG. 6A, the transmitting member 140 may be rotated in the same direction as that of the driving member 120 without being axially moved. That is, the driving member 120 may axially move the transmitting member 140 according to a rotation direction of the driving member 120.

Figure 8:
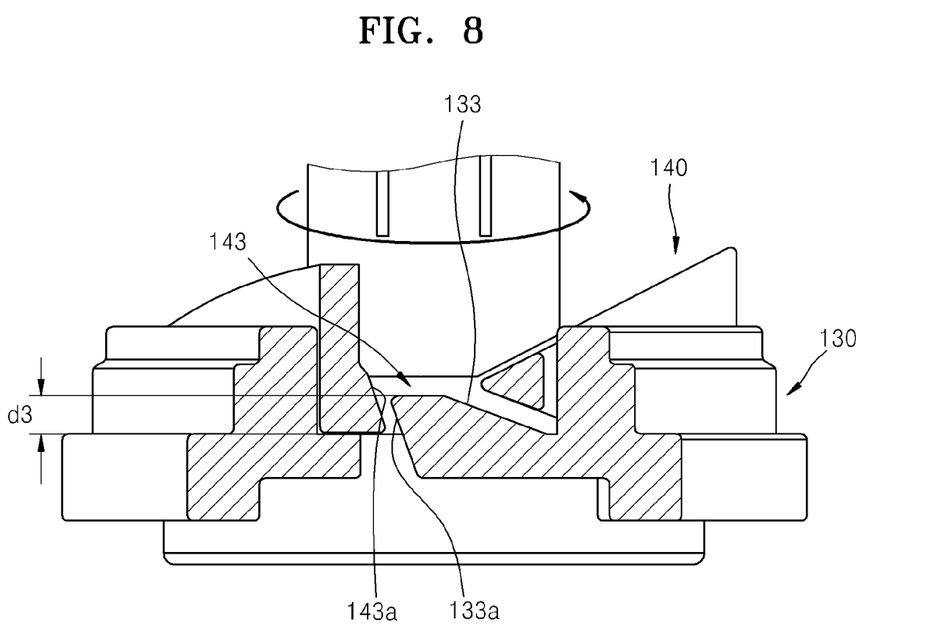
FIG. 8 is a cutaway view illustrating a portion of the power transmitting apparatus of FIG. 3.

FIG. 8 is a cutaway view illustrating a portion of the power transmitting apparatus 100 of FIG. 3. In detail, FIG. 8 is a cutaway view illustrating the power transmitting apparatus 100 so that the hook groove 143 of the transmitting member 140 and the hook protrusion 133 of the driven member 130 are exposed. Here, for convenience of description, the driving member 120 is not shown. Referring to FIG. 8, contact surfaces 143a and 133a between the hook groove 143 of the transmitting member 140 and the hook protrusion 133 of the driven member 130 may be inclined with respect to the rotation direction of the transmitting member 140. Because the contact surfaces 143a and 133a are inclined with respect to the rotation direction of the transmitting member 140, the transmitting member 140 is closely approached to the driven member 130 according to the rotation of the transmitting member 140. Thus, when the transmitting member 140 and the driven member 130 are rotated, the release of the coupling between the transmitting member 140 and the driven member 130 may be prevented, and abrasion of the hook protrusion 133 may be prevented.

Referring again to FIG. 5, the elastic member 150 is disposed between the transmitting member 140 and the driven member 130 to provide the elastic bias into the transmitting member 140 in the direction of the driving member 120. To axially move the transmitting member 140 in the direction of the driven member 130 by the rotation of the driving member 120 in the state where the elastic member 150 is disposed between the transmitting member 140 and the driven member 130, a force F1 axially applied into the transmitting member 140 by the driving member 120 is greater than an elastic force F2 of the elastic member 150. If not, even though the driving member 120 is rotated, the transmitting member 140 is not axially moved due to the elastic force F2 of the elastic member 150, and thus is not connected to the driven member 130.

A friction member 160 may be disposed between the transmitting member 140 and the driven member 130. As the friction member 160 is provided, when the driving member 120 is rotated, the friction member 160 may guide the transmitting member 140 so that the transmitting member 140 is axially moved in the direction of the driven member 130. As a result, the power of the driving member 120 may be surely transmitted to the driven member 130 through the transmitting member 140. Particularly, in spite of the rotation of the driving member 120, the transmitting member 140 may not reach up to the driven member 130 according to magnitude of the elastic force F2 of the elastic member 150 disposed between the transmitting member 140 and the driven member 130. However, as the friction member 160 is disposed between the transmitting member 140 and the driven member 130, when the transmitting member 140 is engaged with the driving member 120 and thus rotated, a friction force may be exerted into the transmitting member 140 in a direction opposite to the rotation direction of the transmitting member 140. Thus, a rotation velocity of the transmitting member 140 may be less than that of the driving member 120.

As described above, the transmitting member 140, which does not intactly follow the rotation of the driving member 120, is axially moved in the direction of the driven member 130 along the inclined part 121 of the driving member 120 in proportion to a rotation distance difference between the transmitting member 140 and the driving member 120. As a result, the hook groove 143 of the transmitting member 140 is coupled to the hook protrusion 133 of the driven member 130, and the power of the driving member 120 is surely transmitted to the driven member 130 through the transmitting member 140. Here, the friction member 160 may provide a friction force into the transmitting member 140 and be formed of a fluidic material. Although not expressly shown, as the transmitting member 140 is axially moved, the friction member 160 may be fluidified into lower and side portions of the transmitting member 140. However, the present general inventive concept is not limited to the material of the friction member 160. As occasion demands, the friction member 160 may be formed of a material which does not have fluidity.

Figure 9:
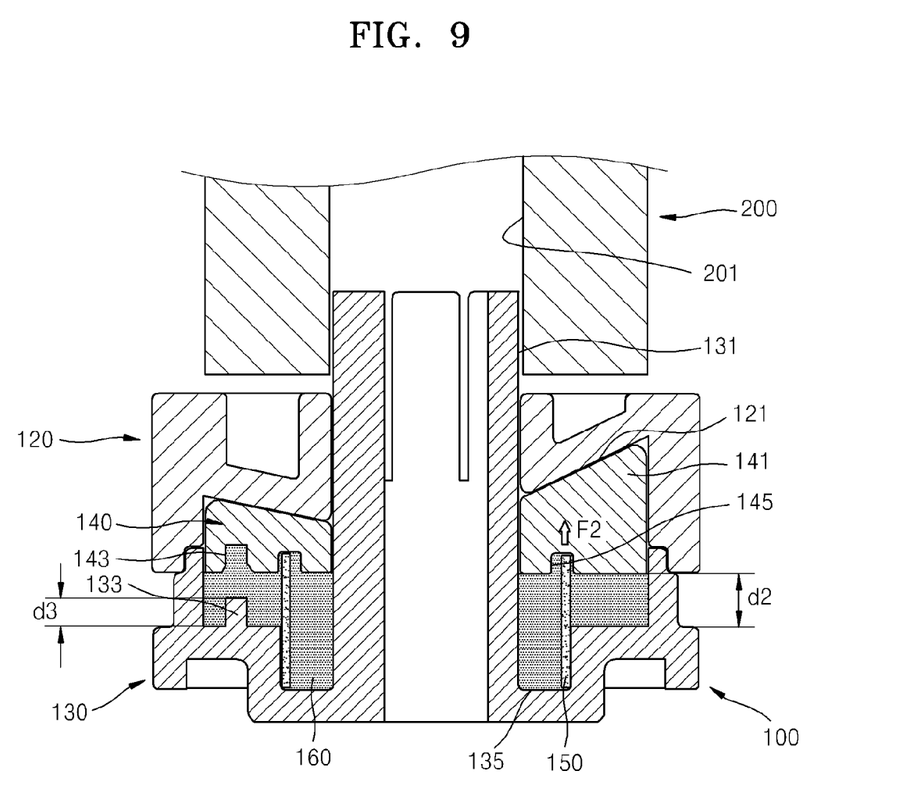
FIG. 9 is a schematic cross-sectional view illustrating an arrangement relationship between the parts in a state where the rotation of the driving member is stopped in the power transmitting apparatus of FIG. 3.

FIG. 9 is a schematic cross-sectional view illustrating an arrangement relationship between the parts in a state where the rotation of the driving member 130 is stopped in the power transmitting apparatus 100 of FIG. 3. Referring to FIG. 9, when the rotation of the driving member 120 is stopped, the force F1 axially applied into the transmitting member 140 by the driving member 120 is released. The elastic member 150 is expanded into a direction of the driving member 120. Thus, the transmitting member 140 disposed above the elastic member 150 is spaced from the driven member 130. To separate the spaced transmitting member 140 from the driven member 130, the axially moving distance d2 of the transmitting member 140 may be greater than a height d3 of the hook protrusion 133 of the driven member 130. Thus, the connection between the transmitting member 140 and the driven member 130 is released. That is, when the power transmitted to the driving member 120 by the driving source 110 is released, the linkage between the driven member 130 and the driving member 120 may be released, and thus, the driven member 130 may be bilaterally rotated. In addition, the roller member 200 that is connected to the driven member 130 may also be bilaterally rotated.

In summary, when the driving member 120 is rotated by the driving source 110, the driving member 120 is connected to the driven member 130 through the transmitting member 140. When the rotation of the driving member 120 is stopped, the transmitting member 140 is separated from the driven member 130 by the elastic member 150 disposed between the transmitting member 140 and the driven member 130 to release the connection between the transmitting member 140 and the driven member 130.

When the driving member 120 is rotated by the driving source 110, the driving member 120 guides the movement of the transmitting member 140 along the inclined part 121 in the axis direction. After the transmitting member 140 is axially moved by a predetermined distance, the driving member 120 contacts and rotates the transmitting member 140.

After the transmitting member 140 is axially moved by the driving member 120, the hook groove 143 of the transmitting member 140 is connected to the hook protrusion 133 of the driven member 130. In the state where the hook protrusion 133 of the driven member 130 is connected to the hook groove 143 of the transmitting member 140, as the transmitting member 140 is rotated, the hook protrusion 133 and the hook groove 143 are engaged with each other to rotate the driven member 130 together. As the driven member 130 is rotated, the roller member 200 fixedly connected to the driven member 130 is rotated to transfer the recording medium P. As described above, to rotate the driven member 130 by being linked with the driving member 120, the elastic member 150 has the elastic force F2 so that the elastic member 150 does not interrupt the connection between the transmitting member 140 and the driven member 130. The elastic force F2 of the elastic member 150 may be less than the force F1 applied into the transmitting member 140 in the axis direction by the driving member 120.

When the driving member 120 is not rotated, the driving member 120 does not move the transmitting member 140 any more in the axis direction. That is, the force F1 applied into the transmitting member 140 in the axis direction by the driving member 120 does not exist. Thus, the elastic member 150 moves the transmitting member 140 through the elastic force F2 thereof in a direction in which the transmitting member 140 is separated from the driven member 130. The transmitting member 140 is rotated in an opposite direction along the inclined part 121 of the driving member 120 while being moved in the direction of the driving member 120 by the elastic force F2. Here, the gear part 123 of the driving member 120 may be easily rotated in the opposite direction by backlash against the gear part 113 of the driving source 110.

Although the present general inventive concept is described with reference to the embodiment, this is exemplary only. For example, although the image forming apparatus adopting the printing device 20 which forms an image by using the toners of cyan, magenta, yellow, and black colors through an electrophotographic method in the above-described embodiment, the present general inventive concept is not limited thereto. The image forming apparatus according to the present general inventive concept may be applied to an image forming apparatus which forms an image on the recording medium P through various methods such as a printing device which forms a single color image through an electrophotographic method, a printing device using an inkjet printing method, or a printing device using a thermal transfer printing method, for example. Also, although the power transmitting apparatus 100 of FIG. 3 is connected to the heating and press rollers 31 and 33 and the transfer roller unit 13 in FIG. 2, the present general inventive concept is not limited thereto. For example, the power transmitting apparatus 100 may be connected to the roller members 26, 28, 41, and 43 transferring the recording medium P.

In a power transmitting apparatus and an image forming apparatus adopting the same, when the power is released, an elastic member disposed between a transmitting member and a driven member may separate the transmitting member from the driven member so that a roller member fixedly connected to the driven member is bilaterally rotated. Thus, the user may easily remove a recording medium. Also, because the power transmitting apparatus uses a mechanical method, manufacturing costs and power consumption may be relatively reduced when compared to that using an electromagnetic method.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A power transmitting apparatus comprising:
a driving source;
a driving member rotated by the driving source;
a driven member selectively linked with the driving member to rotate;
a transmitting member disposed between the driving member and the driven member, the transmitting member configured to be rotated by the driving member along a rotation direction of the driving member and axially moved so that the transmitting member is selectively connected to the driven member by coupling a protrusion to a groove corresponding to the protrusion; and
an elastic member disposed between the transmitting member and the driven member, the elastic member providing an elastic bias into the transmitting member so that the transmitting member is selectively separated from the driven member, wherein
the driving member is disposed between the driving source and the transmitting member,
by rotation of the transmitting member in the rotation direction, the transmitting member imparts a rotational force to the driven member in the rotation direction through a contact surface between the protrusion and the groove, and
the contact surface is inclined with respect to the rotation direction of the transmitting member so that the rotation of the transmitting member causes the transmitting member and the driven member to closely approach each other.

2. The power transmitting apparatus of claim 1, wherein, when the rotation of the driving member is stopped, the transmitting member is separated from the driven member by the elastic bias of the elastic member.

3. The power transmitting apparatus of claim 2, wherein the elastic member has an elastic force that is less than a force axially applied into the transmitting member by the driving member when the driving member is rotated.

4. The power transmitting apparatus of claim 1, wherein one of the driving member and the transmitting member comprises an inclined part that is inclined in the rotation direction of the driving member to guide the movement of the transmitting member in the axis direction when the driving member is rotated, and the other one of the driving member and the transmitting member comprises a contact part contacting the inclined part.

5. The power transmitting apparatus of claim 4, wherein the contact part has a shape corresponding to that of the inclined part.

6. The power transmitting apparatus of claim 1, wherein one of the transmitting member and the driven member comprises the protrusion that protrudes axially, and
the other one of the transmitting member and the driven member comprises the groove corresponding to the protrusion.

7. The power transmitting apparatus of claim 1, wherein an axially moving distance of the transmitting member is less than an axially overlapping distance between the transmitting member and the driving member.

8. The power transmitting apparatus of claim 1, wherein the axially moving distance of the transmitting member is greater than a height of the protrusion.

9. A power transmitting apparatus comprising:
a driving source;
a driving member rotated by the driving source;
a driven member selectively linked with the driving member to rotate;
a transmitting member disposed between the driving member and the driven member, the transmitting member being rotated by the driving member, axially moved along a rotation direction of the driving member so that the transmitting member is selectively connected to the driven member;
an elastic member disposed between the transmitting member and the driven member, the elastic member providing an elastic bias into the transmitting member so that the transmitting member is selectively separated from the driven member; and,
a friction member disposed between, in an axial direction, the transmitting member and the driven member, wherein
when the driving member is rotated by the driving source, the friction member provides a friction force to the transmitting member in a opposite direction which is opposite to a rotation direction of the driving member and the transmitting member is axially moved so that the transmitting member is connected to the driven member.

10. An image forming apparatus comprising:
a paper feeding device feeding a recording medium;
a printing device forming an image on the recording medium;
a fusing device applying heat and pressure to the recording medium on which the image is formed by the printing device; and
a discharge device discharging the recording medium passing through the fusing device,
wherein at least one of the paper feeding device, the printing device, and the discharge device comprises a roller member transferring the recording medium and a power transmitting apparatus transmitting power to the roller member,
wherein the power transmitting apparatus comprises:
a driving source;
a driving member rotated by the driving source;
a driven member selectively linked with the driving member to rotate, the driven member being fixedly connected to the roller member;
a transmitting member disposed between the driving member and the driven member, the transmitting member configured to be rotated by the driving member along a rotation direction of the driving member and axially moved so that the transmitting member is selectively connected to the driven member by coupling a protrusion to a groove corresponding to the protrusion; and
an elastic member disposed between the transmitting member and the driven member, the elastic member providing an elastic bias into the transmitting member so that the transmitting member is selectively separated from the driven member, wherein
the driving member is disposed between the driving source and the transmitting member,
by rotation of the transmitting member in the rotation direction, the transmitting member imparts a rotational force to the driven member in the rotation direction through a contact surface between the protrusion and the groove, and
the contact surface is inclined with respect to the rotation direction of the transmitting member so that the rotation of the transmitting member causes the transmitting member and the driven member to closely approach each other.

11. The image forming apparatus of claim 10, wherein, when the rotation of the driving member is stopped, the transmitting member is separated from the driven member by the elastic bias of the elastic member.

12. The image forming apparatus of claim 11, wherein the elastic member has an elastic force that is less than a force axially applied into the transmitting member by the driving member when the driving member is rotated.

13. The image forming apparatus of claim 10, wherein one of the driving member and the transmitting member comprises an inclined part that is inclined in the rotation direction of the driving member to guide the movement of the transmitting member in the axis direction when the driving member is rotated, and
the other one of the driving member and the transmitting member comprises a contact part contacting the inclined part.

14. The image forming apparatus of claim 13, wherein the contact part has a shape corresponding to that of the inclined part.

15. The image forming apparatus of claim 10, wherein one of the transmitting member and the driven member comprises the protrusion that protrudes axially, and
the other one of the transmitting member and the driven member comprises the groove corresponding to the protrusion.

16. The image forming apparatus of claim 10, wherein an axially moving distance of the transmitting member is less than an axially overlapping distance between the transmitting member and the driving member.

17. The image forming apparatus of claim 10, wherein the axially moving distance of the transmitting member is greater than a height of the protrusion.

18. The image forming apparatus of claim 10, wherein the protrusion and groove comprise a hook protrusion and hook groove, respectively.

19. An image forming apparatus comprising:
a paper feeding device feeding a recording medium;
a printing device forming an image on the recording medium;
a fusing device applying heat and pressure to the recording medium on which the image is formed by the printing device; and
a discharge device discharging the recording medium passing through the fusing device, wherein at least one of the paper feeding device, the printing device, and the discharge device comprises a roller member transferring the recording medium and a power transmitting apparatus transmitting power to the roller member, wherein the power transmitting apparatus comprises:

a driving source;

a driving member rotated by the driving source;

a driven member selectively linked with the driving member to rotate, the driven member being fixedly connected to the roller member;

a transmitting member disposed between the driving member and the driven member, the transmitting member being rotated by the driving member, axially moved along a rotation direction of the driving member so that the transmitting member is selectively connected to the driven member;

an elastic member disposed between the transmitting member and the driven member, the elastic member providing an elastic bias into the transmitting member so that the transmitting member is selectively separated from the driven member; and a friction member disposed between, in an axial direction, the transmitting member and the driven member, wherein when the driving member is rotated by the driving source, the friction member provides a friction force to the transmitting member in a opposite direction which is opposite to a rotation direction of the driving member and the transmitting member is axially moved so that the transmitting member is connected to the driven member.

20. A method for selectively applying a driving force to a recording medium transfer roller in an image forming apparatus, the method comprising:

rotating a driving member using the driving force;

selectively linking the driving member with a driven member connected to the roller, to rotate the roller;

providing an elastic force to a transmitting member with an elastic member during a non-rotation by the driving member, so that the transmitting member is selectively separated from the driven member, wherein the transmitting member is disposed between the driving member and the driven member, the elastic member is disposed between the transmitting member and the driven member; and providing a mechanical force to the transmitting member during the rotation by the driving member, to overcome the elastic force so that the transmitting member is selectively connected to the driven member by coupling a protrusion to a groove corresponding to the protrusion; and rotating the transmitting member in a rotation direction such that the transmitting member imparts a rotation to the driven member in the rotation direction through a contact surface between the protrusion and the groove, the contact surface being inclined with respect to the rotation direction of the transmitting member so that the rotating of the transmitting member causes the transmitting member and the driven member to closely approach each other, wherein the driving member is disposed between the driving force and the transmitting member.

* * * * *